United States Patent
Filippi et al.

(10) Patent No.: US 10,562,768 B2
(45) Date of Patent: Feb. 18, 2020

(54) PROCESS AND PLANT FOR THE PRODUCTION OF AMMONIA MAKE-UP GAS INCLUDING PRODUCTION OF A HYDROGEN GAS BY STEAM REFORMING

(71) Applicant: Casale SA, Lugano (CH)

(72) Inventors: Ermanno Filippi, Castagnola (CH); Raffaele Ostuni, Milano Lugano (CH)

(73) Assignee: Casale SA (CH)

( * ) Notice: Subject to any disclaimer, the term of this patent is extended or adjusted under 35 U.S.C. 154(b) by 111 days.

(21) Appl. No.: 14/915,061

(22) PCT Filed: Sep. 2, 2014

(86) PCT No.: PCT/EP2014/068631
§ 371 (c)(1),
(2) Date: Feb. 26, 2016

(87) PCT Pub. No.: WO2015/032763
PCT Pub. Date: Mar. 12, 2015

(65) Prior Publication Data
US 2016/0207766 A1  Jul. 21, 2016

(30) Foreign Application Priority Data
Sep. 9, 2013  (EP) ..................... 13183524

(51) Int. Cl.
*C01B 3/34* (2006.01)
*C01B 3/02* (2006.01)
(Continued)

(52) U.S. Cl.
CPC ..................... *C01B 3/34* (2013.01); *B01J 7/00* (2013.01); *B01J 12/00* (2013.01); *C01B 3/025* (2013.01);
(Continued)

(58) Field of Classification Search
None
See application file for complete search history.

(56) References Cited

U.S. PATENT DOCUMENTS

| 5,609,040 A * | 3/1997 | Billy ....................... C01B 3/025 62/622 |
| 6,551,380 B1 | 4/2003 | Reddy et al. |

(Continued)

FOREIGN PATENT DOCUMENTS

| DE | 33 08 305 A1 | 9/1984 |
| EP | 2 631 213 A1 | 8/2013 |
| FR | 2 961 802 A1 | 12/2011 |

OTHER PUBLICATIONS

International Search Report issued in connection with PCT/EP2014/068631.
(Continued)

*Primary Examiner* — Wayne A Langel
(74) *Attorney, Agent, or Firm* — Akerman LLP

(57) ABSTRACT

A process and plant for producing a makeup synthesis gas (20) for the synthesis of ammonia, comprising: reforming of a hydrocarbon feedstock (10) in a steam reformer (SMR), purification of said gas product obtaining a hydrogen synthesis gas, addition of a suitable amount of nitrogen (19) to said hydrogen synthesis gas, wherein said purification includes separation of hydrogen in a main separation unit (S1), which produces a hydrogen current (14) and a tail gas (15), and wherein further hydrogen is recovered from the said tail gas (15) in an additional separation unit (S2); some embodiments provides that an amount of gas product (24) is also fed to said additional separation unit; a corresponding method for the revamping of a front-end of an ammonia plant is also disclosed.

16 Claims, 2 Drawing Sheets

(51) Int. Cl.
*C01C 1/04* (2006.01)
*B01J 7/00* (2006.01)
*B01J 12/00* (2006.01)
*C01B 3/56* (2006.01)
*C01B 3/48* (2006.01)
*C01B 3/52* (2006.01)
*C01B 3/38* (2006.01)

(52) U.S. Cl.
CPC .............. *C01B 3/38* (2013.01); *C01B 3/48* (2013.01); *C01B 3/52* (2013.01); *C01B 3/56* (2013.01); *C01B 2203/0233* (2013.01); *C01B 2203/0283* (2013.01); *C01B 2203/043* (2013.01); *C01B 2203/0415* (2013.01); *C01B 2203/0475* (2013.01); *C01B 2203/068* (2013.01); *C01B 2203/1235* (2013.01); *C01B 2203/147* (2013.01)

(56) References Cited

U.S. PATENT DOCUMENTS

| | | | |
|---|---|---|---|
| 7,871,457 B2* | 1/2011 | Shah | C01B 32/50 423/437.1 |
| 8,241,400 B2* | 8/2012 | Grover | B01D 53/047 95/96 |
| 8,303,930 B2* | 11/2012 | Chen | C01B 3/384 422/612 |
| 8,394,174 B2* | 3/2013 | Chen | C01B 3/384 423/418.2 |
| 2002/0120017 A1* | 8/2002 | Bohn | C07C 1/0485 518/703 |
| 2002/0143219 A1* | 10/2002 | Price | C01B 3/025 585/16 |
| 2009/0246118 A1 | 10/2009 | Drnevich et al. | |
| 2010/0056648 A1* | 3/2010 | Schroer | C01B 3/34 518/703 |
| 2011/0098367 A1* | 4/2011 | Assink | C01B 3/34 518/705 |
| 2013/0041049 A1* | 2/2013 | Bowe | C01B 3/34 518/702 |
| 2014/0120023 A1* | 5/2014 | Singh | B01J 14/00 423/359 |
| 2014/0170052 A1 | 6/2014 | Iaquaniello et al. | |

OTHER PUBLICATIONS

International Preliminary Report on Patentability issued in connection with PCT/EP2014/068631.
A Combination of Proven Technologies, Nitrogen, British Sulphur Co, London, GB, vol. 208, Mar. 1, 1994, pp. 44, 45 and 47-49.

* cited by examiner

PROCESS AND PLANT FOR THE PRODUCTION OF AMMONIA MAKE-UP GAS INCLUDING PRODUCTION OF A HYDROGEN GAS BY STEAM REFORMING

This application is a national phase of PCT/EP2014/068631, filed Sep. 2, 2014, and claims priority to EP 13183524.1, filed Sep. 9, 2013, the entire contents of both of which are hereby incorporated by reference.

FIELD OF THE INVENTION

The present invention relates to the production of make-up gas for the synthesis of ammonia. The invention discloses a process and plant for the production of said make-up gas, and a method for revamping an existing plant. The invention relates, more in detail, to production of make-up gas for the synthesis of ammonia including the reforming of a hydrocarbon feedstock into a gas product comprising hydrogen, purification of said gas product into a substantially pure hydrogen gas, and addition of nitrogen.

PRIOR ART

Ammonia synthesis plants have usually a front-end section where a hydrocarbon feedstock, for example natural gas, is converted into an appropriate make-up synthesis gas for the synthesis of ammonia. Said gas contains hydrogen and nitrogen in a suitable molar ratio, which is around 3:1.

A known process includes basically the steps of obtaining a hydrogen gas by reforming a hydrocarbon source, such as natural gas, and adding nitrogen to said hydrogen gas.

For example, a known process of the above kind comprises: reforming of the hydrocarbon source into a gas product comprising hydrogen, plus other components such as steam, residual hydrocarbons, carbon monoxide CO and carbon dioxide $CO_2$; purification by means of shift conversion of CO into $CO_2$, and optionally a carbon dioxide removal, then separation of hydrogen ($H_2$) in a suitable hydrogen separation unit, for example a pressure swing adsorption (PSA) unit.

The output of said hydrogen separation is a current of substantially pure hydrogen, which is mixed with a nitrogen stream furnished by an air separation unit (ASU), to meet the desired molar ratio of around 3:1 between $H_2$ and $N_2$.

Further to said hydrogen current, the hydrogen separation produces a residual gas stream, which is referred to as tail gas. Said tail gas contains a certain amount of methane and, in most cases, is recycled as additional fuel for the steam reforming.

It is commonly desired to increase the capacity of the front-end, in terms of the amount of make-up gas exported by the front end. Said capacity is mainly dependent on the amount of hydrogen that is made available by the separation unit after reforming of the hydrocarbon source, since nitrogen is relatively easy to obtain from air separation. The capacity in terms of hydrogen is dependent upon the capacity of the main items including the reformer, the shift converter and the carbon dioxide removal section, when provided.

Improving the efficiency of the separation unit is possible but only enables a limited hydrogen capacity increase.

Revamping only some of the items, for example the reformer, would not constitute a solution since the other items may be unable to cope with the increased flow rate of gas. Revamping the whole train of reformer, shift converter and $CO_2$ removal, and related auxiliaries, is expensive and requires a long shutdown of the plant. Other techniques such as installation of an additional autothermal reformer are also expensive.

The same problem is encountered in the design of a new plant, considering the capacity in relation to the capital cost. There is an incentive to provide more capacity without an excessive increase of the cost and size of reformer, shift converter, $CO_2$ removal section.

The invention aims to meet this need, by providing a cost-effective way of increasing the capacity of the above described process and plant.

SUMMARY OF THE INVENTION

An aspect of the invention is the recovery of an additional amount of hydrogen from the tail gas of a conventional step of hydrogen separation. The applicant has found that the tail gas, for example discharged by a conventional PSA unit, contains a significant amount of hydrogen, generally around 10-15% of the hydrogen produced in the reformer. Accordingly, at least a portion of the tail gas is subjected to a further step of hydrogen separation.

The invention provides a process for producing a makeup synthesis gas for the synthesis of ammonia, comprising:

reforming of a hydrocarbon feedstock into a gas product comprising hydrogen, purification of said gas product, obtaining a hydrogen synthesis gas, adding a suitable amount of nitrogen to said hydrogen synthesis gas, wherein said purification includes a first step of separation of hydrogen which produces a hydrogen current and a tail gas, the process being characterized in that:

at least a portion of said tail gas is subject to a further step of separation of hydrogen, to obtain a further hydrogen current which contains hydrogen recovered from said tail gas.

The term of hydrogen current is used to denote a gas current as obtainable from a hydrogen separation device, for example a pressure swing adsorption unit, thus having a high concentration of hydrogen. Normally, a hydrogen current is a current of substantially pure hydrogen, apart from very minor amounts of other components. The purity of such hydrogen current is normally greater than 99% and in most cases is greater than 99.9%.

The term of gas product is used to denote the synthesis gas as obtained after the reforming process, or after an intermediate stage of purification, e.g. after shift conversion or after carbon dioxide removal.

In some embodiments, one or both of the above mentioned steps of hydrogen separation is/are carried out by means of a pressure swing adsorption process.

Said reforming is preferably a steam reforming process. The invention is applicable preferably to a process and plant where reforming of the hydrocarbon source is carried out with a steam reformer (primary reformer) only, that is without a secondary reformer or autothermal reformer (ATR).

Said step of purification preferably includes: a shift conversion of carbon monoxide into carbon dioxide; optionally a step of carbon dioxide removal with a known technique; the separation of hydrogen.

The tail gas is normally available at a low pressure. Hence, the pressure of said gas is advantageously raised, for example with a suitable booster compressor, prior to the feeding to said further step of hydrogen separation.

In the prior art, the recycle of the tail gas to a reforming section imposes that the tail gas is discharged at a sufficient pressure, usually around 0.35 bar or more. This generates a counter-pressure on the hydrogen separation section, which affects the amount of recoverable hydrogen, for example in a PSA unit. A feature of the invention is that the tail gas discharge pressure of said first separation section can be lower than conventional, thanks to the subsequent steps of compression and feeding to the second hydrogen separation section. In some embodiments, said pressure can be 0.3 bar or less.

According to further embodiments, also a portion of gas product is subjected to said further step of hydrogen separation. Said gas product can be taken at any intermediate step of the purification after reforming. When the purification comprises a carbon dioxide removal, some embodiments of the invention provide that at least a portion of said gas product is drawn prior to the carbon dioxide removal, thus bypassing said carbon dioxide removal. Such bypass may be adopted, for example, when the total amount of product gas would exceed the capacity of the available carbon dioxide removal section.

In some embodiments, different streams of gas product can be taken at different stages of the purification process, to feed the second hydrogen separation. For example an embodiment may provide that a first stream of gas product is taken after a shift conversion and prior to carbon dioxide removal, and another stream is taken after the carbon dioxide removal.

Hydrogen separation is carried out according to a pressure swing adsorption (PSA) process in the preferred embodiments of the invention. The invention, however, is also applicable to other available techniques for hydrogen separation, such as membrane-based separators.

In one of the preferred embodiments of the invention, a product gas is generated by steam reforming of a hydrocarbon source, such as natural gas, and is purified by shift conversion and by removal of carbon dioxide. Then, the so purified gas product is sent to a main PSA unit for separation into a main current of substantially pure hydrogen, and a tail gas. The tail gas released by the main PSA unit, or at least a portion thereof, is compressed and fed to a second PSA unit, which produces an additional current of hydrogen and a residual tail gas.

Said additional current of hydrogen is exported together with the main current of hydrogen, for example they are mixed and then added with the required amount of nitrogen.

The residual tail gas contains a significant amount of methane, and can be recycled as a fuel.

As mentioned before, the step carbon dioxide removal is an optional feature of the invention. The invention is applicable also to process and plant without a carbon dioxide removal unit, where the tail gas contains also carbon dioxide.

Further aspects of the invention are a plant and a method for revamping of an existing plant, according to the attached claims.

An aspect of the invention is a plant for the production of makeup synthesis gas for the synthesis of ammonia, comprising a reforming section for the reforming of a hydrocarbon feedstock into a gas product comprising hydrogen, a purification section suitable for the removal of components other than hydrogen from said gas product and for obtaining a hydrogen synthesis gas, and means to add a suitable amount of nitrogen to said hydrogen synthesis gas, wherein said purification section includes a first hydrogen separation section which produces a first hydrogen current and a tail gas, characterized in that:

said purification section comprises also a second hydrogen separation section, which is arranged to treat at least a portion of said tail gas, producing a second hydrogen current containing hydrogen recovered from said tail gas.

The revamping method of the invention comprises the installation of a second hydrogen separation section, further to an existing hydrogen separation section, and the redirection of at least a portion of the tail gas discharged by the existing separation section to the newly-installed separation section, to recover a further amount of hydrogen.

The existing and/or the new separation section operate preferably with a PSA process.

The method usually requires also the installation of a compression section (booster) to raise the tail gas to a suitable pressure for feeding of the newly installed separation section. The availability of said new compression section allows lowering the tail gas discharge pressure of an existing hydrogen separation section, which has a positive effect on the performance of said section.

Some embodiments of the revamping method provide also an increase of the capacity of the existing reforming section. Said increase of capacity may be accomplished for example by replacement of the tubes in a tube reformer, by installation of a pre-reformer or installation of another reformer in parallel to the existing one.

When the capacity of the reforming section is increased, the equipment downstream of the reformer may be unable to process the increased amount of gas. In some embodiments of the invention, this problem is solved by directing a portion of the product gas leaving the reformer, preferably after at least a shift conversion, to the newly installed hydrogen separation section.

When the purification section comprises a carbon dioxide removal section, at least a portion of product gas may be sent to the new separation section, bypassing the carbon dioxide removal. This bypass may be appropriate when the existing carbon dioxide removal section cannot deal with the increased gas flow rate and a revamping of said section would be too expensive.

For example, a common embodiment provides a line including a steam reformer, a shift converter, a carbon dioxide removal section and a PSA unit. After installation of the new PSA unit and revamping of the steam reformer, a portion of the gas leaving the shift converter is sent to the new PSA unit, bypassing the carbon dioxide removal section. If appropriate, also a portion of the $CO_2$-depleted gas leaving the carbon dioxide removal section can be sent to the new PSA unit, to avoid an excessive increase of the duty of the original PSA unit.

Other items of the plant will be revamped according to the needs, as apparent to a skilled reader. For example an air separation unit may require a revamping to furnish the necessary amount of nitrogen.

The applicant has found that the recovery of hydrogen contained in the tail gas of a conventional front-end result in a significant increase of capacity, which may reach 10%-15% in some embodiments.

Despite the need to compress the tail gas for feeding the new hydrogen separation section, thus consuming a certain power, the applicant has found that the increase of capacity is still attractive and make the modification cost-effective.

An advantage of the invention is that more capacity is obtained without any modification to the existing reformer, shift converter, and equipment for carbon dioxide removal and hydrogen separation. Furthermore, the revamping is mostly performed offline, without requiring a shutdown. Another advantage is that the efficiency of the existing hydrogen separation section (e.g. of an existing PSA unit) can be enhanced by lowering the tail gas discharge pressure, as above explained. Said efficiency is understood as the amount of hydrogen which is separated from the input gas.

The embodiments of the invention featuring also the feeding of gas product to the additional hydrogen separation provide a greater increase of capacity with a limited cost. For example, an increase of capacity up to around 30% can be obtained by means of a relatively inexpensive modification of the reforming section (e.g. adding a pre-reformer) and a slight modification of the shift converter, when necessary.

The above advantages are achieved in the revamping of existing plants and in the realization of new plants as well. In case of a new plant, the increase of capacity is determined in comparison with the standard design. The capital cost is given mostly by the reformer, shift converter and carbon dioxide removal. A plant according to the invention may deliver significantly more hydrogen and then more synthesis gas for ammonia compared to a conventional plant having substantially the same capital cost.

The advantages of the invention will be more evident with the help of the following description of preferred and non-limiting embodiments.

DETAILED DESCRIPTION OF A PREFERRED EMBODIMENT

Figure 1:
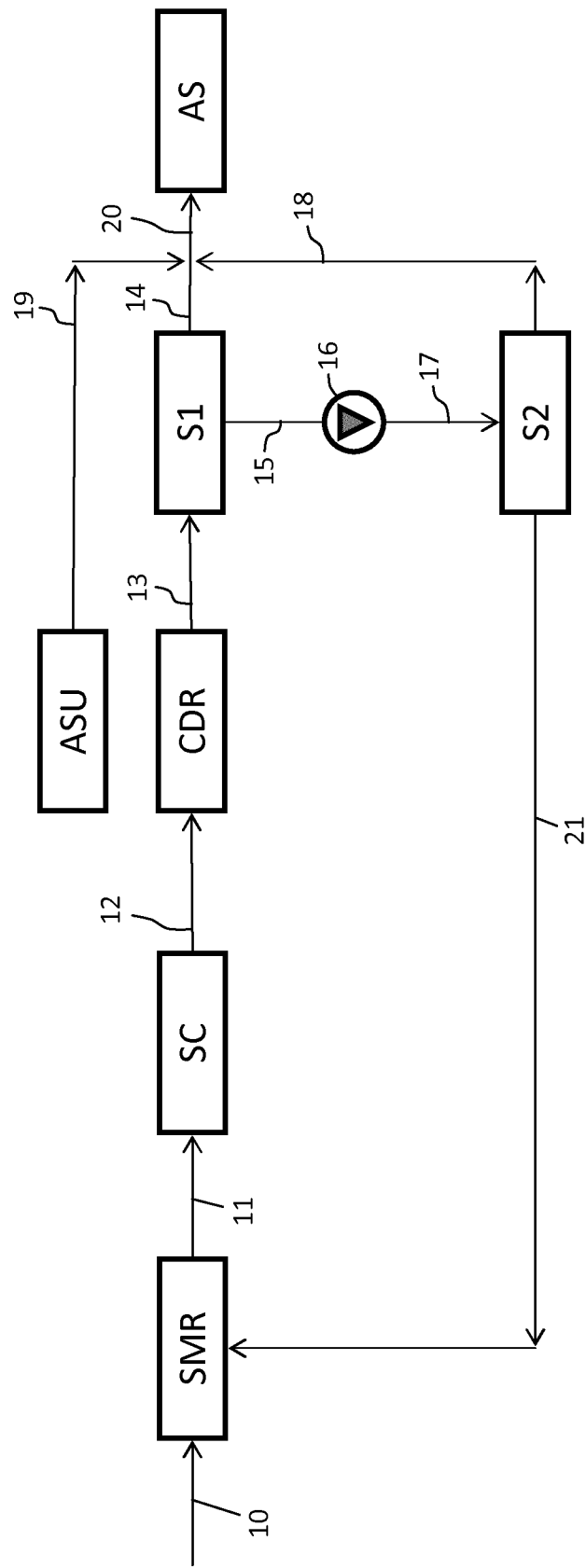
FIG. 1 is a block diagram of an ammonia plant, including a front-end section according to an embodiment of the invention.

Referring to FIG. 1, a front-end for the synthesis of ammonia make-up gas comprises a steam methane reformer SMR, and a purification section comprising a shift converter SC, a carbon dioxide removal section CDR, a first pressure swing adsorption unit S1 for separation of hydrogen from the gas leaving said carbon dioxide removal section CDR.

According to the embodiment of FIG. 1, the purification section comprises also a second pressure swing adsorption unit S2, arranged to process the tail gas discharged by the first unit S1 and containing come unrecovered hydrogen.

More in detail, a hydrocarbon source 10, such as natural gas, is fed to the reformer SMR, producing a gas product 11 which comprises $H_2$, CO, $CO_2$, $CH_{43}$ other hydrocarbons (HC) and other impurities.

Since the desired output is hydrogen ($H_2$) with a high purity, said gas product 11 is purified by means of conversion of CO into $CO_2$ in the converter SC, obtaining a gas product 12, and removal of carbon dioxide in the section CDR.

The $CO_2$-depleted gas 13 is sent to the first PSA unit S1, which can be seen as the main hydrogen separation unit. Here, said gas 13 is separated into a current 14 of substantially pure hydrogen (e.g. containing more than 99.9% hydrogen), and a tail gas 15 containing methane and some non-separated hydrogen.

At least a portion of said tail gas 15 is sent to the second PSA unit S2, via a booster compressor 16. Said compressor 16 delivers a flow 17 at a suitable pressure for feeding said second unit S2. Preferably the full amount of tail gas 15 is directed to said second unit S2, as shown.

Said second unit S2 produces a second hydrogen current 18 which is mixed with the main hydrogen current 14 from the main PSA unit S1, and added with a nitrogen stream 19, to obtain a make-up gas 20 suitable for the synthesis of ammonia. The nitrogen stream 19 comes, for example, from an air separation unit ASU.

Said makeup gas 20 feeds an ammonia synthesis loop denoted with AS.

The second separation unit S2 produces also a residual gas 21 with a relatively high content of methane, which is for example recycled to fuel the reformer SMR.

It is to be noted that the carbon dioxide removal section is an optional feature. In some embodiments, the gas product 12 leaving the shift converter SC may be sent directly to the main separation unit S1.

The scheme of FIG. 1 is applicable to a new plant and to a revamped plant as well.

An example of a revamping according to the invention is as follows.

The original plant comprises the steam methane reformer SMR, the shift converter SC, the carbon dioxide removal section CDR, and the first PSA hydrogen separation unit S1. The tail gas 15 from said unit S1 may be originally recycled to the reformer SMR or discharged.

Revamping of said plant provides the installation of the new PSA hydrogen separation unit S2 and related booster compressor 16. At least a portion of the tail gas 15 (from the first unit S1) is fed to said new hydrogen separation unit S2 via the compressor 16, and the so obtained current 18 containing additionally recovered hydrogen is merged with the output current 14 of the original first separation unit S1.

In some embodiments, the pressure of tail gas 15, that is the discharge pressure of the first separation unit S1, is decreased after the installation of the new unit S2 and compressor 16. This is possible because the tail gas 15 is no longer required to feed the stem reformer SMR, and a suitable input pressure for the unit S2 is provided by the newly installed booster compressor 16. A lower discharge pressure has a positive effect on the efficiency of the separation process carried out in the pre-existing first unit S1, which means that also the amount of hydrogen in the current 14 is increased by means of the revamping process.

Then, the invention provides more output of hydrogen, thanks to the additional hydrogen 18 recovered from tail gas 15, and thanks to the more hydrogen in the current 14 due to the lower tail gas discharge pressure of the original unit S1.

The flow rate of nitrogen 19 is increased as a consequence, to provide the necessary amount of nitrogen. To this purpose, an existing ASU may need a proper revamping.

The residual gas 21 leaving the new hydrogen separation unit S2 is preferably directed to the steam reformer SMR. It can be noted that said gas 21 contains a higher concentration of methane and has a higher heat value, compared to the tail gas 15 originally recycled to the steam reformer. Hence, also the use of tail gas as fuel takes advantage from the invention.

It has to be noted that the revamping has no impact on the duty of steam reformer, shift converter and carbon dioxide removal section. Despite the additional output of hydrogen, the flow rate of streams 11, 12, 13 remains unchanged.

Revamping of other items such as pumps, compressors, etc. might be provided according to the needs.

Figure 2:
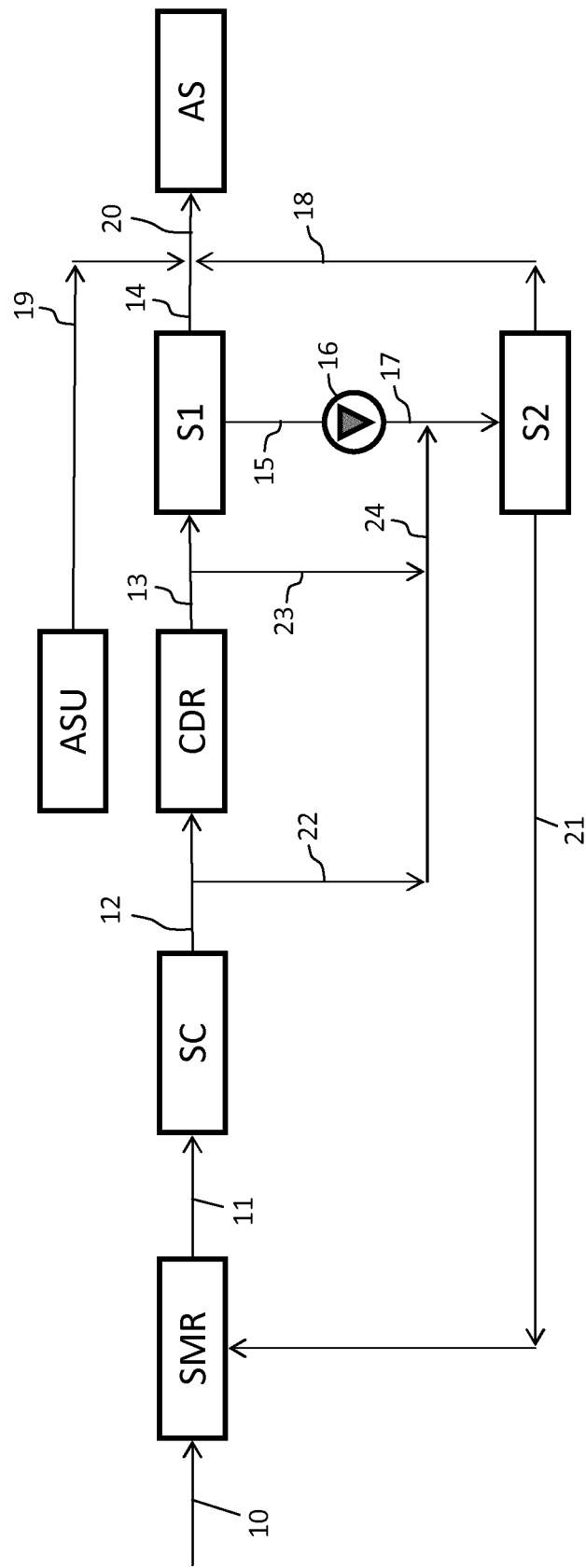
FIG. 2 is a block diagram of another embodiment of the invention.

FIG. 2 shows another embodiment of the invention where the second hydrogen separation unit S2 receives also a current of product gas 24. Said product gas 24 can be merged with the delivery stream 17 of the booster compressor 16.

Said product gas 24 may be taken from any location in the purification section downstream the reformer SMR and prior to the first separation unit S1. In the example of FIG. 2, said product gas 24 is taken partly from the stream 12 leaving the shift converter SC (flow line 22), and partly from the de-carbonated stream 13 (flow line 23).

The product gas of stream 22 bypasses the $CO_2$ removal section CDR. Said bypass may be preferred when the capacity of said section CDR is not sufficient to process the full amount of gas 12 leaving the shift converter SC.

The invention claimed is:

1. A process for producing a makeup synthesis gas for the synthesis of ammonia, comprising:
    reforming of a hydrocarbon feedstock into a gas product comprising hydrogen,
    purification of said gas product, obtaining a hydrogen synthesis gas,
    adding nitrogen to said hydrogen synthesis gas,
    wherein said purification includes a first step of separation of hydrogen which produces a hydrogen current and a tail gas,
    wherein:
    at least a portion of said tail gas is subject to a further step of separation of hydrogen, to obtain a further hydrogen current which contains hydrogen recovered from said tail gas, and wherein said further hydrogen current is added to said hydrogen synthesis gas.

2. The process according to claim 1, wherein said first step of separation of hydrogen and/or said further step of separation of hydrogen is carried out by means of pressure swing adsorption.

3. The process according to claim 1, wherein the pressure of said tail gas is raised prior to the feeding to said further step of hydrogen separation.

4. The process according to claim 3, the discharge pressure of tail gas from said first step of hydrogen separation being less than 0.3 bar.

5. The process according to claim 1, wherein:
    a stream of said gas product is subjected to said further step of hydrogen separation.

6. The process according to claim 5, wherein
    said purification of the gas product includes steps of shift conversion of carbon monoxide to carbon dioxide, and removal of carbon dioxide, prior to said first step of hydrogen separation, and
    at least a portion of said gas product subjected to the further step of hydrogen separation is taken after the shift conversion and prior to the carbon dioxide removal, bypassing said carbon dioxide removal.

7. A plant for the production of makeup synthesis gas for the synthesis of ammonia, comprising a reforming section (SMR) for the reforming of a hydrocarbon feedstock into a gas product comprising hydrogen, a purification section suitable for the removal of components other than hydrogen from said gas product and for obtaining a hydrogen synthesis gas, and means to add nitrogen to said hydrogen synthesis gas, wherein said purification section includes a first hydrogen separation section which produces a first hydrogen current and a tail gas,
    wherein said purification section comprises a second hydrogen separation section, which is arranged to treat at least a portion of said tail gas, producing a second hydrogen current containing hydrogen recovered from said tail gas;
    wherein means are provided to add said second hydrogen current to said hydrogen synthesis gas.

8. The plant according to claim 7, said first hydrogen separation section and/or said second hydrogen separation section operating according to a pressure swing adsorption process.

9. The plant according to claim 7, said purification section comprising a compression section for feeding tail gas from the first hydrogen separation section to the second hydrogen separation section.

10. The plant according to claim 7, comprising also a flow line arranged to feed a stream of said gas product to said second hydrogen separation section.

11. The plant according to claim 10, said purification section comprising a carbon dioxide removal section (CDR), wherein at least a portion of said stream of gas product directed to the second hydrogen separation section is taken prior to the carbon dioxide removal section, bypassing said carbon dioxide removal section.

12. A method for revamping a plant for producing a makeup synthesis gas for the synthesis of ammonia, wherein said plant comprises a reforming section (SMR) for the reforming of a hydrocarbon feedstock into a gas product comprising hydrogen, a purification section for the removal of components other than hydrogen from said gas product and for obtainment of a hydrogen synthesis gas, and means to add a nitrogen current to said hydrogen synthesis gas, said purification section including a first hydrogen separation section producing a first hydrogen current and a tail gas,
    wherein the method comprises:
    installation of a second hydrogen separation section,
    redirection of at least a portion of said tail gas to said second hydrogen separation section,
    said second separation section being arranged to provide a second hydrogen current containing hydrogen recovered from said tail gas; and
    installation of means to add said second hydrogen current to said hydrogen synthesis gas.

13. The method according to claim 12, further comprising the step of lowering the original tail gas discharge pressure of said first hydrogen separation section.

14. The method according to claim 12, further comprising:
    a revamping of said reforming section (SMR), increasing the production rate of said reforming section and thus providing an increase of the flow rate of reformed gas product leaving said reforming section, and
    arranging means to direct a portion of said gas product to said second separation section.

15. The method according to claim 14 wherein:
    the purification section of the plant comprises a carbon dioxide removal section (CDR), and
    the method comprising the installation of a bypass line arranged to feed a portion of product gas to the second separation section bypassing said carbon dioxide removal section (CDR).

16. The method according to claim 12, where the existing hydrogen separation section and/or the newly installed second hydrogen separation section operates according to the pressure swing adsorption process.

* * * * *